United States Patent
Capps et al.

(10) Patent No.: US 6,803,905 B1
(45) Date of Patent: Oct. 12, 2004

(54) TOUCH SENSITIVE APPARATUS AND METHOD FOR IMPROVED VISUAL FEEDBACK

(75) Inventors: Christopher Louis Capps, Raleigh, NC (US); Scott Michael Hallihan, Cary, NC (US); Brenda Maltba Scott, Raleigh, NC (US); Gayle Colby Steinbugler, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1043 days.

(21) Appl. No.: 08/866,402

(22) Filed: May 30, 1997

(51) Int. Cl.[7] ................................................. G09G 5/00
(52) U.S. Cl. ....................... 345/173; 345/172; 345/702; 345/773
(58) Field of Search ................................ 340/731, 712; 341/20; 178/19; 345/173, 127, 168, 146, 352, 172, 700, 702, 773; 395/500, 701; 364/900

(56) References Cited

U.S. PATENT DOCUMENTS

| | | | | |
|---|---|---|---|---|
| 4,366,475 A | * | 12/1982 | Kishi et al. ................. | 340/731 |
| 4,686,332 A | * | 8/1987 | Greanias et al. .............. | 178/19 |
| 4,821,030 A | * | 4/1989 | Batson et al. ................ | 340/712 |
| 4,914,624 A | * | 4/1990 | Dunthorn .................... | 364/900 |
| 5,402,151 A | * | 3/1995 | Duwaer ..................... | 345/173 |
| 5,563,632 A | * | 10/1996 | Roberts ..................... | 345/173 |
| 5,596,346 A | * | 1/1997 | Leone et al. ................. | 345/127 |
| 5,638,060 A | * | 6/1997 | Kataoka et al. ............... | 341/20 |
| 5,687,331 A | * | 11/1997 | Volk et al. ................... | 345/352 |
| 5,736,974 A | * | 4/1998 | Selker ....................... | 345/146 |
| 5,736,976 A | * | 4/1998 | Cheung ..................... | 345/168 |
| 5,761,485 A | * | 6/1998 | Munyan ..................... | 395/500 |
| 5,838,973 A | * | 11/1998 | Carpenter-Smith et al. . | 395/701 |

\* cited by examiner

*Primary Examiner*—Regina Liang
*Assistant Examiner*—Duc Q Dinh
(74) *Attorney, Agent, or Firm*—Daniel E. McConnell

(57) ABSTRACT

A touch sensitive apparatus and method of operation to improve visual feedback and visual perception of tactile input to an operator. The apparatus includes a touch screen device or display having a touch overlay, a processor and stored program instructions in a memory in which a three-dimensional graphical image, such as a key element, is created in the apparatus and shown on the display as an input device or keypad to the processor. Each key element includes a beveled surface surrounding a flat surface. When a displayed key element is touched by a probe, such as a finger, the screen area about the displayed key element and the finger, visually enlarges or "splats" confirming the selection of the particular key. Concomitantly or simultaneously, the key element detents or depresses within the key pad, changes color and bevel size further verifying the key selection to the operator thereby creating a sense of key movement and visual perception of tactile input to the operator aiding in the operation of the key pad. The simultaneous visual key enlargement, visual detenting and change in key color and bevel size upon key selection in a touch sensitive apparatus improves the feedback to the operator in the selection and confirmation of a key element actuated by the operator.

6 Claims, 4 Drawing Sheets

TOUCH SENSITIVE APPARATUS AND METHOD FOR IMPROVED VISUAL FEEDBACK

BACKGROUND OF THE INVENTION

1. Field of the Invention

This invention relates to touch sensitive apparatus and methods of operation. More particularly, the invention relates to improved touch screen interfaces with improved visual feedback to an operator.

2. Description of Prior Art

Touch sensitive apparatus as described, for example in U.S. Pat. No. 4,686,332, issued Aug. 11, 1987, and assigned to the same assignee as that of the present invention, provide limited visual feedback to an operator in verifying actuation of a touch element(s) presented on a touch screen. Typically, when pressing touch points or elements on a touch screen, the user is given visual or auditory feedback (or both) confirming or verifying the touch operation. Auditory feedback is usually a "beep"; visual feedback is usually in the form of reverse video or color change. However, visual feedback may not be apparent to the user when pressing touch elements on a touch screen because the visual feedback may be hidden by an operator or user's finger.

There is a need in touch sensitive apparatus and its operation to improve visual feedback to an operator with respect to sight and perception of feel in confirming and/or verifying actuation of a touch point or element on a touch screen by the operator. Confirmation or verification of touch point actuation is particularly important where the touch point may be hidden by an operator's finger or hand while the point is actuated or in the case of touch pads confined to a small area of a touch screen.

Prior art related to verification of touch point actuation in touch sensitive apparatus includes the following:

U.S. Pat. No. 5,053,758, issued Oct. 1, 1991, discloses a touchscreen control panel apparatus that highlights a control key to which an operator slide touches and actuates the associated control function upon touch release from the highlighted key. Highlighting is deleted from the key when the operator slides touches therefrom without releasing the touch.

U.S. Pat. No. 5,119,079, issued Jun. 2, 1992, discloses a touch sensitive user interface including control logic responsive to the touch sensitive user interface for determining the contact position of a probe, such as a finger. A system controller identifies a contact zone of a predetermined size with respect to the interface. The control logic actuates a feature within the system represented a displayed image in response to a user touch. The system controller enlarges the contact zone of the selected feature upon selection thereof to a size accommodating a finger without overlapping on adjacent areas. Upon completion of a selection, the controller returns the key element to a previously predetermined size.

U.S. Pat. No. 5,565,888, issued Oct. 15, 1996, discloses apparatus for improving visibility and selectibility of images or icons on a touch screen. The apparatus enhances the visibility of the images or icons and other types of menu items by increasing the size or skew or both of one or more icons or menu items in a generally inverse relation to, the proximity of a cursor image address to particular icons or menu items. Increasing the size of icons or menu items, enhances user recognition of an ordinarily small menu items or icons and simultaneously provides the effect of stabilizing the cursor position during selection without affecting the linearity of response to a graphic input device.

None of the prior art discloses a touch sensitive apparatus and methods of operation for improving an operator's visual verification (feedback) and visual perception of tactile input (the illusion of pushing a key element inward) of a touch point upon actuation on a touch screen.

SUMMARY OF THE INVENTION

An object of the invention is a touch sensitive apparatus and method of operation having improved touch feedback to an operator.

Another object is a touch sensitive apparatus and method for providing an operator with visual touch verification and visual perception of tactile input in touch screen operation.

Another object is a touch sensitive apparatus and method for altering visual feedback to an operator according to the operator's touch point location on a touch screen.

Another object is a touch key element having feedback which visually enlarges and visually detents or depresses within a keypad upon touch by an operator.

Another object is an improved method for touch key element operation in a touch sensitive apparatus in providing an operator with an improved visual feedback and a visual perception of tactile input of touch point selection in the touch screen.

These and other objects, features and advantages are achieved in a touch sensitive apparatus including a display having a touch overlay, a processor and stored program instructions in a memory in which a graphical image, such as a key element, is created and displayed on the display as an input device or key pad to the processor upon touching the touch overlay or touch screen by an operator. The key element image created appears graphical and in three dimensional form, that is, bevels surrounding key elements give it the appearance of a raised surface on the screen. When a key element in the displayed screen is touched by a probe, such as a finger, the screen area about the finger visually enlarges or "splats" confirming the selection of the particular key. Simultaneously, the key element visually detents or depresses within the key pad, the bevels decrease in size, and the key face changes color further verifying the key selection to the operator. The creation of a visual sense of key movement and visual perception of tactile input (illusion of pushing the key element inward) to the operator aids in the operation of the key pad. The simultaneous visual key enlargement, visual detenting, bevel changes and change in key color upon key selection in a touch sensitive apparatus overcomes the operator feedback problem described in the prior art.

DESCRIPTION OF THE DRAWINGS

The invention will be further understood from the following detailed description of a preferred embodiment taken in conjunction with the appended drawing, in which.

DESCRIPTION OF PREFERRED EMBODIMENT

Figure 1:
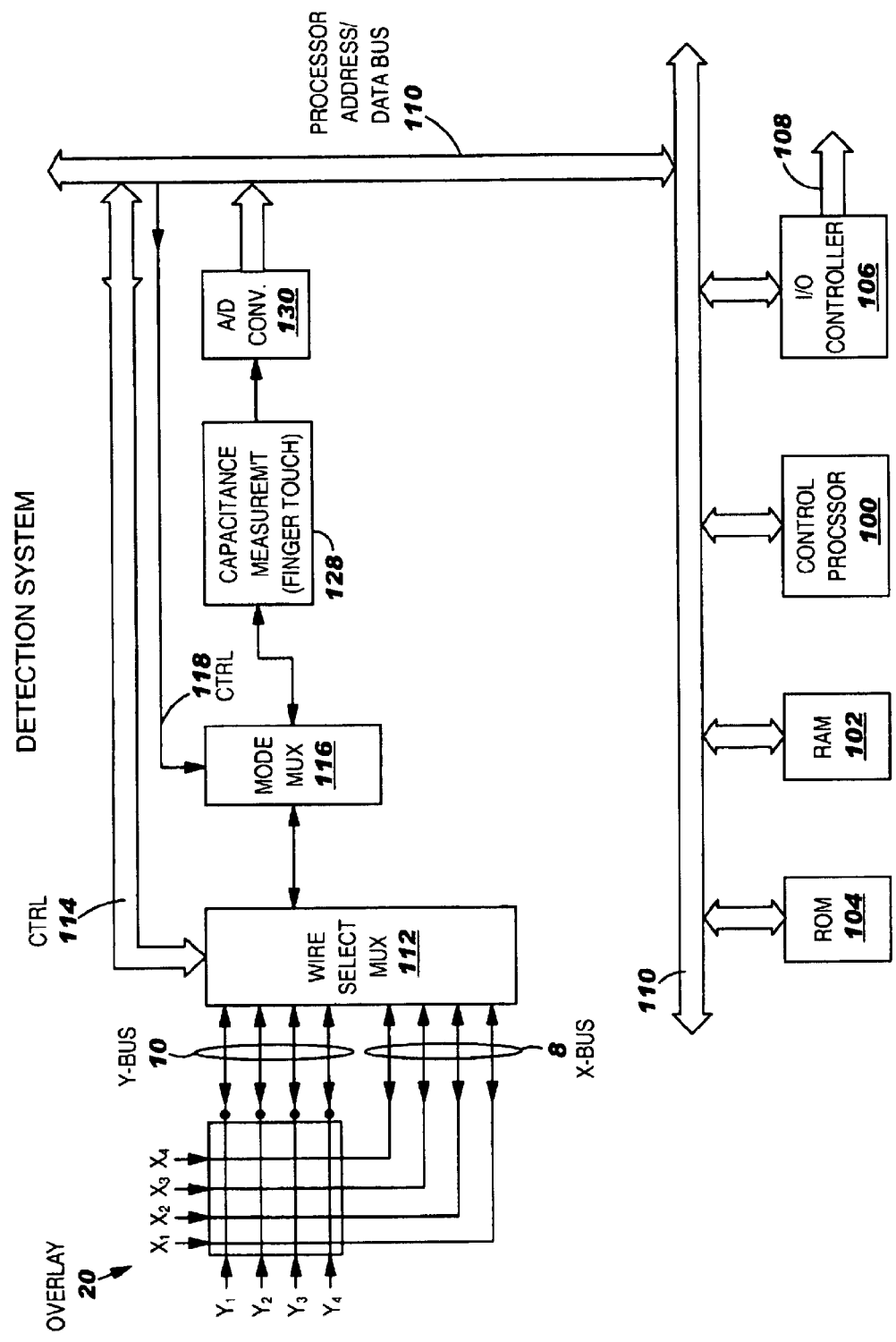
FIG. 1 is a representation of a prior art touch sensitive apparatus incorporating the features of the present invention.

In FIG. 1, a prior art touch point sensitive apparatus, for example, U.S. Pat. No. 4,686,332, assigned to the assignee of the present invention and fully incorporated herein by reference, may be modified by stored program instructions described in the present invention to provide improved visual feedback and visual perception of tactile input to an operator using a key element in the system of FIG. 1. It should be noted that any touch sensitive apparatus, e.g resistive, infrared, capacitance and the like may be modified by the present invention to achieve the same improved visual feedback results to an operator as will be described for FIG. 1.

Briefly, the touch sensitive apparatus of FIG. 1 includes a touch overlay screen 20 mounted on a display (not shown) for receiving touch input signals. The overlay 20 includes vertical conductors X1-X112 connected through an X bus 80 to a wire select multiplexer 112 and horizontal Y conductors Y1-Y112 connected through a Y bus 90 to the wire selection multiplexer 112. The multiplexer 112 is connected through a mode multiplexer 116 to a capacitance measurement device 128 which is used for a capacitance finger touch detection. The output of the capacitance measurement device is connected through an analog digital convertor 130 to a processor address/databus 110. Control input 114 to the wire selection multiplexer 112 is connected to the bus 110 and a control input 118 to the mold multiplexer 116 is connected to the bus 110. The processor address/databus 110 interconnects the control processor 100 with a Read Only Memory (ROM) 104, a Random Access Memory (RAM) 102 and an I/O controller 106. The controller 106 has an I/O bus 108 which connects to a host processing system such as the I/O bus of an IBM personal computer.

The wire selection multiplexer 112 and the mode multiplexer 116 connect selected patterns of a plurality of the horizontal and vertical conductors of the overlay 20 to the capacitance measurement device 128 in response to control signals applied over the control input 114 and 118 from the bus 110 by the control processor 100. During finger touch operations, the capacitance measurement device 128 has its input coupled through the mode multiplexer and the wire selection multiplexer 112 to selected ones of the horizontal and vertical conductors in the overlay 20 in response to control signals from the control processor 100. The output of the capacitance measurement device 128 is converted to digital values by the converter 130 and is applied over the bus 110 to the control processor 100 which executes a sequence of stored program instructions to detect the horizontal array conductor pair and the vertical array conductor pair in the overlay 20 being touched by an operator's finger at a desired selection point in a graphical image, such as a key pad, appearing in a screen of the display in the touch system of FIG. 1. Software programs for implementing the present invention are also stored in the RAM 102 or ROM 104 for (i) creating a graphical image of touch points in the display, and (ii) providing improved visual feedback and visual perception of tactile input to an operator actuating a touch point through the overlay 20. The stored programs of the present invention will be described in conjunction with FIGS. 2, 3A and 3B.

Figure 2:
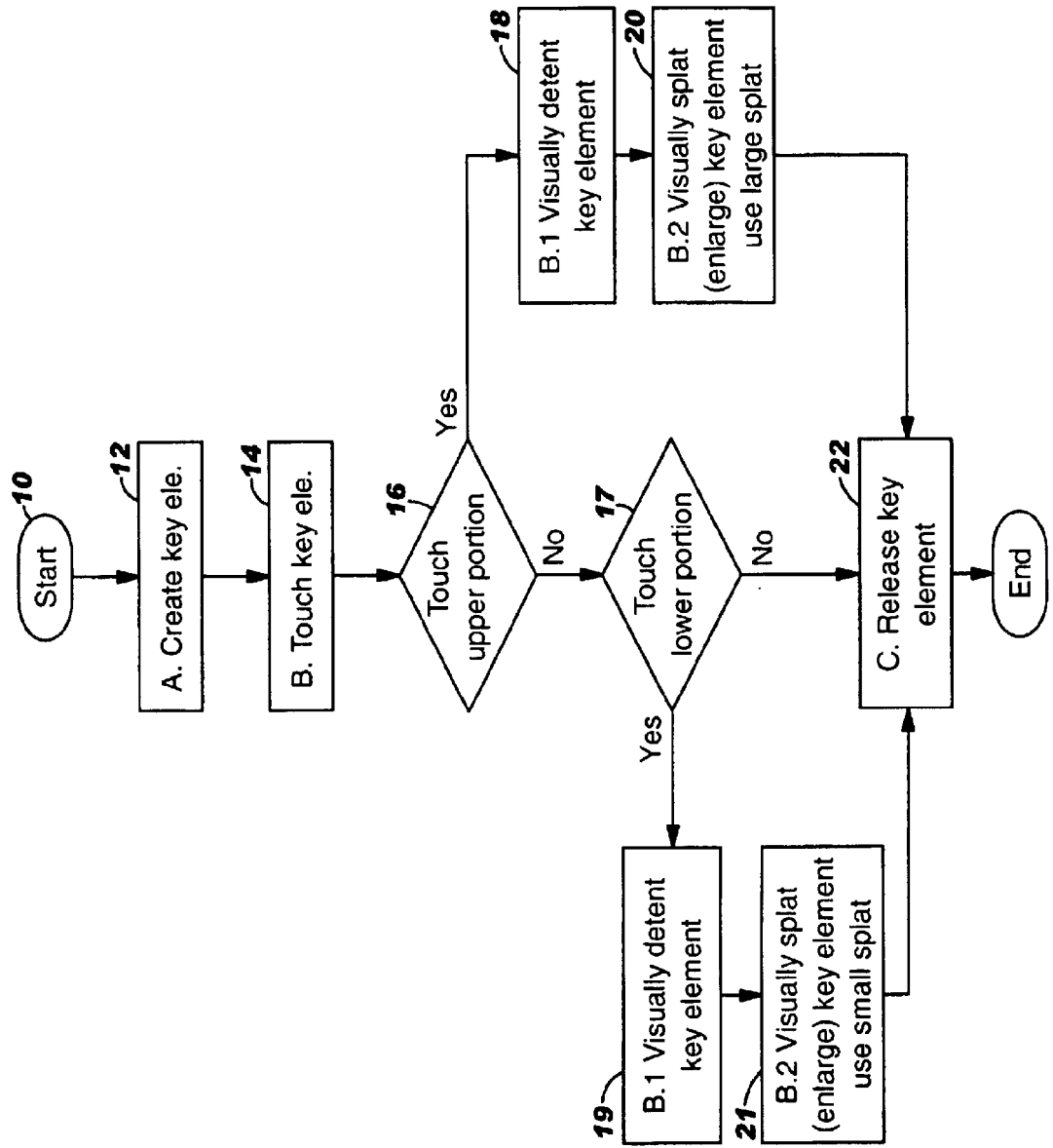
FIG. 2 is a flow diagram implementing the operation of the invention in the system of FIG. 1.

FIG. 2 is a flow chart which describes the programming functions for creating a graphical image of touch key elements in the display and providing the improved visual feedback and visual perception of tactile input to an operator upon actuating a touch point through the overlay 20 or upon the touch screen.

The program is entered in a program start function 10 which initiates a create key element step 12 for display in the touch sensitive apparatus of FIG. 1. The graphical image formed in the function 12 may be in any form or shape and can be created by several commercially available software programs, for example, DELPHI published by Borland International Inc., 100 Borland Way, Scotts Valley, Calif. 95067 USA and Visual Basic published by Microsoft Press, One Microsoft Way, Redmond, Wash. 98052 USA. The foregoing and other like programs allow a programmer to select graphic elements from a tool palette, drag them into a interface page, and set properties such as size, color, bevel width, etc. The resulting applications access user input by object events and provide information such as touch coordinates.

Figure 3A:
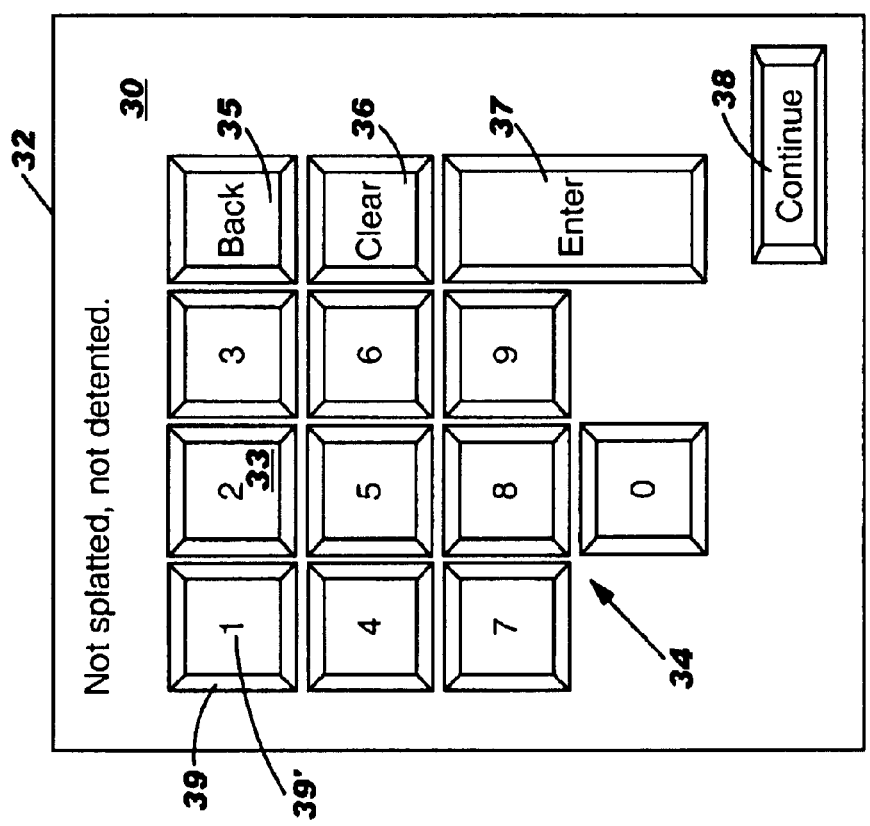
FIG. 3A is a representation of a key touch pad with key elements displayed in the touch system of FIG. 1 ready for key actuation by an operator.

For purposes of illustration, as shown in FIG. 3A, a three-dimensional (3D) keypad 30 may be created and displayed in a screen 32 of the display in the touch system of FIG. 1. The 3D key pad includes a series of numerical key elements 34, in one form 0–9, and functional keys 35, 36, 37, and 38, as indicated in FIG. 3A.

Returning to FIG. 2, the programs of the present invention stored in the RAM 102 or ROM 104 (see FIG. 1) are entered in the step 10 which starts or initializes the programs for use by an operator. A program step 12 creates the 3D graphical key elements, shown in FIG. 3A, using the following steps:

(a) Each key element 34 in the key pad 30 has a face 33 upon which an outer three dimensional graphical bevel 39 is formed leaving a flat surface 39';

(b) The key element and indicia or text are in contrasting colors;

(c) A default key element size is established and the key elements are drawn within an enclosure to simulate a key pad for display on the touch system, such as that of FIG. 1.

Figure 3B:
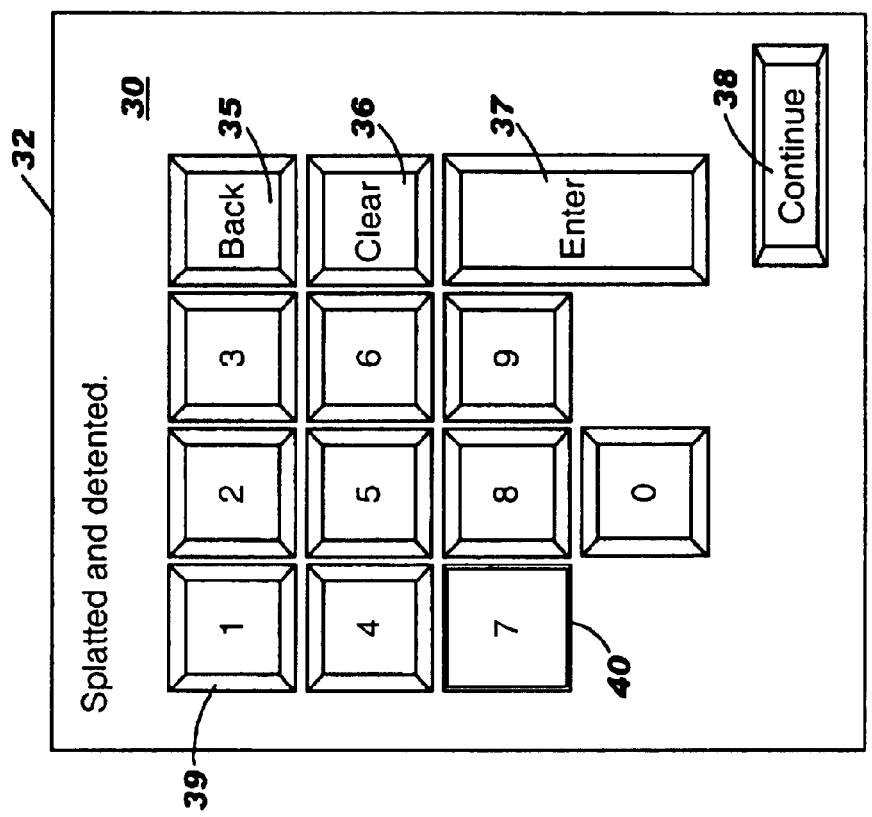
FIG. 3B is a representation of FIG. 3A after actuation of a key element by an operator and showing key enlargement, detenting, bevel changes and key color change in the system of FIG. 1.

A touch key element program step 14 is initiated upon an operator touching a key element in the keypad 30 displayed in the touch system, such as that of FIG. 1. In one form, the program step 14 initiates a test 16 or test 17 to determine whether an upper portion or lower portion of a key element 34 has been actuated by an operator using the key pad 30 displayed in the touch system, such as that of FIG. 1. A "yes condition" for test 16 initiates a step 18 in which the touch key element visually detents or depresses within the key pad, shown in FIG. 3B, according to the following steps:

(a) the key element face 39' in the touched key element 33 changes color;

(b) the outer bevel 39 (See FIG. 3A) is removed and a smaller inner bevel 40, shown in FIG. 3B, is displayed around the key element face in reverse image to the outer bevel coloring;

(c) The disappearance of the outer bevel 39, the appearance of the inner bevel 40 and the changed key coloring verifies or confirms the selection of the key element.

These changes create an illusion of key movement which the operator may visually perceive as tactile input or an illusion of pushing a key element inward in connection with the actuated key element.

Concomitantly or simultaneously with the step 18, a visual enlargement or splatting about the key element takes place, as shown in FIG. 3B, according to the following steps:

(a) when the program step 14 receives a signal from the converter 130 (see FIG. 1) indicating the upper portion of the key element has been actuated, a first signal is sent to the operating system in the touch system of FIG. 1 to enlarge the selected key element displayed in the screen by a defined amount in the x and y coordinate directions;

(b) the selected key element visually expands or "splats";

(c) optionally, the key element may be offset relative to the other key elements to further improve visual feedback of key actuation.

Upon release of key element by the operator, the key element returns to its original state (See FIG. 3A) in a step 22, according to the following steps:

(a) the outer bevel 39 is displayed and the inner bevel 40 is removed;

(b) the key element face 33 and indica or text coloring are returned to their original state, shown in FIG. 3A;

(c) The key element positions in the key pad 30 are reset (but only if the key element positions were optionally offset);

(d) The default key element size is reset to the original size.

Returning to FIG. 2, a "no" condition for the test 16 initiates a test 17 to determine if the lower portion of the key element 34 has been actuated. A "yes" condition initiates a step 19 to detent the selected key element in the manner described for the step 18. Concomitantly or simultaneously, a step 21 is performed to visually enlarge or splat the actuated key element, but to a lesser extent than in the case of the touching the upper portion of the key element, described in connection with the step 20. When the lower portion of the key element is actuated a second signal is sent by the converter 130 (See FIG. 1) to the program 14 which sends a second signal to the operating system of the processor 100 to expand the key element in coordinate sizes to a lesser amount than that of program step 20, previously described. Upon release of the key element by the operator, the key element returns to its original state in program step 22.

The larger visual splatting in the case of the step 20 solves the problem of a hand covering a larger portion of the key element when the upper portion of the key element is touched. The enlarged splatting area ensures that the operator receives visual feedback confirming the key element has been actuated. Visual feedback for touching the lower portion of a key element is impacted to a lesser extent by the hand covering the key element which lessens the size needed for visually splatting the actuated key element. Optionally, the program step 14 may be modified to provide numerous variations in amount of visual feedback depending where the key element is touched or actuated.

While the invention has been described in a preferred embodiment, various modifications may be made therein without the parting from the spirit and scope of the invention as defined in the appended claims in which;

We claim:

1. In a system having a processor, a display for producing a visual representation of a plurality of keys, a position sensing subsystem for providing signals indicating that an area on the display has been selected by an operator and a memory for storing programming instructions for controlling the operation of the system, an apparatus for providing improved visual feedback to the operator that an area in the visual representation has been selected, said apparatus comprising:

(a) a circuit responsive to signals provided by said the position sensing subsystem to provide an key-identifying signal indicating that a particular key in the visual representation of said plurality of keys has been selected by the operator; said circuit providing a first type called key-identifying signal when signals from the position subsystem indicate an upper portion of a key is being selected and a second type of key-identifying signal when signals from the position sensing subsystem indicate a lower portion of a key is being selected, and (b) display control logic responsive to the key-identifying signal to alter the visual representation of the selected key by enlarging said the visual representation and by changing said visual representation to have the appearance of a depressed key, said enlargement and change in the visual representation of the selected key occuring substantially simultaneously and said altered visual representation providing visual confirmation of the key selection, said display control logic further including color controlling logic for changing the coloration of the visual representation of the selected key to provide further visual confirmation of the key selection.

2. The apparatus of claim 1 wherein said display control logic responds to the first type of key-identifying signal by generating a first enlarged visual representation of the selected key and to the second type of key-identifying signal by generating a second enlarged visual representation of the selected key, said first and said second enlarged visual representations being different in size.

3. For use in a system having a processor, a display for producing a visual representation of a plurality of keys, a position sensing subsystem for providing signals indicating that an area on the display has been selected by an operator and a memory for storing programming instructions for controlling the operation of the system, a method for providing improved visual feedback to the operator that an area in the visual representation has been selected, said method comprising the steps of:

(a) responding to signals provided by the position sensing subsystem to identify a particular key selected by the operator in the visual representation of the plurality of keys; and (b) altering the visual representation of only the selected key by enlarging the visual representation and by changing its appearance to that of a depressed key, the operations of enlarging and changing the visual representation occurring substantially simultaneously and the changes in visual representation including changing the coloration of the selected key, the altered visual representation providing visual confirmation of the key selection; the visual representation of the selected key is being enlarged as a function of whether signals from the position sensing subsystem indicate that an upper portion or a lower portion of the visual representation of the key was selected.

4. The method of claim 3 wherein the enlargement is greater when the signal from the position sensing subsystem indicates that an upper portion of the visual representation of the key was selected.

5. For use with a system having a processor, a display, a position sensing subsystem for providing signals indicating that an area on the display has been selected by an operator and a memory for storing programming instructions for controlling the operation of the system, an article of manufacture comprising a computer usable medium for storing programming instructions including:

(a) a computer readable code module for causing the display to produce a visual representation of a plurality of keys;

(b) a computer readable code module for processing signals provided by the position sensing subsystem to produce an key-identifying signal indicating that an operator has selected a particular key in the visual representation of the plurality of keys;

(c) a computer readable code module responsive to the key-identifying signal to alter the visual representation of the selected key by enlarging the visual representation and changing the key image to that of a depressed key;

(d) a computer readable code module for changing the coloration of the visual representation of the selected key; and (e) a computer readable code module for providing a first enlargement if the processed signals from the position sensing subsystem indicate that a first portion of the selected key was selected and a second enlargement if the processed signals from the position sensing subsystem indicate that a second portion of the selected key was selected.

6. The article of manufacture of claim 5 wherein the programming instructions stored on said computer usable medium include an additional computer readable code module for providing a first enlargement if the processed signals from the position sensing subsystem indicate that a first portion of the selected key was selected and a second enlargement if the processed signals from the position sensing subsystem indicate that a second portion of the selected key was selected.

* * * * *